UNITED STATES PATENT OFFICE.

GEORGE L. GREGORY, OF MARION, ASSIGNOR OF ONE-HALF TO THE FORT DODGE GYPSUM STUCCO COMPANY, OF FORT DODGE, IOWA.

PLASTER COMPOUND.

SPECIFICATION forming part of Letters Patent No. 315,936, dated April 14, 1885.

Application filed December 13, 1884. (No specimens.)

*To all whom it may concern:*

Be it known that I, GEORGE L. GREGORY, a citizen of the United States, residing at Marion, in the county of Linn and State of Iowa, have invented certain new and useful Improvements in Plaster Compounds; and I do hereby declare the following to be a full, clear, and exact description of the invention, such as will enable others skilled in the art to which it appertains to make and use the same.

My invention consists of an improvement in the manufacture of plaster compound to be used for the first and second coats of plaster, or what is called the "brown-coat" work, &c. One disadvantage of plaster compounds in which gypsum, ground and calcined, is used is, that they have a tendency to swell while setting and drying, which tendency frequently draws the lath out of its place and necessitates its being cut out and patched over. There are also the disadvantages of too rapid setting, of brittleness when set, of tendency to soften when wet by leakage, &c., to crumble when subjected to heat, as when near a stove, of injury from frost when formed in cold weather, and in the cost of the ingredients and expense and delay in their compounding. To overcome these disadvantages I add lime and hair to the ground and calcined gypsum, and to retard the setting of the compound I use a smaller amount of common glue or its equivalent as a retarder than has been found necessary in other plaster compounds in which gypsum, ground and calcined, is an ingredient.

The proportions of lime and glue and hair and sand and gypsum, ground and calcined, are about as follows: gypsum, ground and calcined, a thousand pounds; one bushel of fresh lime; six pounds of common glue; six to eight pounds of washed hair, (the larger amount if the hair is very short,) and good sharp sand in bulk, double the quantity of gypsum.

As to the method of mixing these ingredients, I prefer the following: Put the lime separately in a box, and with it six pounds of cheap glue, or the equivalent in any other retarder; apply water sufficient to slake the lime thoroughly, as for a putty coat, and reduce to the consistency of sweet milk; wet thoroughly in water the washed plastering-hair, and add the same to the lime and glue and mix thoroughly. This amount of liquid is sufficient for the thousand pounds of gypsum, ground and calcined, and the corresponding amount of sand; but in use it may be convenient to mix only part of the gypsum, ground and calcined, and the sand, with its proportionate part of the liquid.

The mixing is as follows: Put the sand in a box first, and then add to the sand the proportion of gypsum, ground and calcined, and mix the two dry, and then add the proportion of liquid above indicated and water to make the compound of the consistency of plastering-mortar.

My use of lime and hair with gypsum, ground and calcined, is essentially different from what is termed gaging hair mortar with gypsum, ground and calcined—*i. e.*, mixing it into the mortar simply to make the plaster set quickly in patching, but not for general use or in connection with any substance designed to retard the setting. The lime is used for two purposes—to facilitate an even mixing of the hair with the gypsum, ground and calcined, and also to make a compound on which a finishing coat can be put as easily as on the ordinary plastering compound in which there is no ground and calcined gypsum, which is not true of other plastering compounds containing ground and calcined gypsum.

By my method of mixing as described, the hair is evenly distributed throughout the mass—a result exceedingly difficult to attain by any other method.

When mixed and prepared as described, the article is ready for immediate use.

What I claim is—

1. The herein-described process of preparing a foundation coat of plastering ready for immediate use, consisting in, first, mixing fresh lime with glue; second, slaking this mixture; third, mixing hair evenly through this liquid compound; fourth, mixing dry gypsum, ground and calcined, with dry, clean, sharp sand;

and, fifth, adding this dry mixture of gypsum, ground and calcined, and the sand to the previous mixture, substantially as described.

2. A partially-liquid compound for a foundation coat of plastering, consisting of gypsum, ground and calcined, sand, fresh-slaked lime, hair, and water, and glue or its equivalent as a retarder, substantially in the proportions and ready for immediate use as described.

In testimony whereof I affix my signature in presence of two witnesses.

GEORGE L. GREGORY.

Witnesses:
AUGUSTINE BREESE,
LYMAN C. GRAY.